(12) United States Patent
Wightman

(10) Patent No.: US 6,499,219 B1
(45) Date of Patent: Dec. 31, 2002

(54) ELECTRIC HAND DRILL SYSTEM

(76) Inventor: Robert Wightman, 1375 Pasadena Ave., S., St. Petersburg, FL (US) 33707

( * ) Notice: Subject to any disclaimer, the term of this patent is extended or adjusted under 35 U.S.C. 154(b) by 0 days.

(21) Appl. No.: 09/675,335

(22) Filed: Sep. 28, 2000

(51) Int. Cl.[7] .................................................. G01C 9/28
(52) U.S. Cl. ................................ 33/334; 33/373; 33/390
(58) Field of Search .................... 33/1 N, 354, 334, 33/347, 370, 390, 371, 373

(56) References Cited

U.S. PATENT DOCUMENTS

| | | | | |
|---|---|---|---|---|
| 3,664,032 A | * | 5/1972 | Tompkins | 33/334 |
| 3,864,839 A | * | 2/1975 | Wolf | 33/334 |
| 4,295,279 A | * | 10/1981 | Sienknecht | 33/390 |
| 4,393,599 A | * | 7/1983 | Sterrenberg | 33/347 |
| 4,457,078 A | * | 7/1984 | Suchy | 33/334 |
| 4,546,549 A | * | 10/1985 | Duperon | 33/390 |
| 4,564,322 A | * | 1/1986 | Stapley | 33/334 |
| 4,656,749 A | * | 4/1987 | Ashley et al. | 33/371 |
| 4,785,544 A | * | 11/1988 | Heinsius et al. | 33/334 |
| 4,986,002 A | * | 1/1991 | Oros et al. | 33/334 |

* cited by examiner

*Primary Examiner*—G. Bradley Bennett

(57) ABSTRACT

An electric hand drill system comprises a hand held electric drill containing a motor. A coupling ring with a radial slot is formed with an interior bearing surface positionable in contact with a recipient surface on the drill. A handle is in a cup-shaped configuration. A first disk is received upon the coupling ring and has indicia upon the exterior surface.

3 Claims, 3 Drawing Sheets

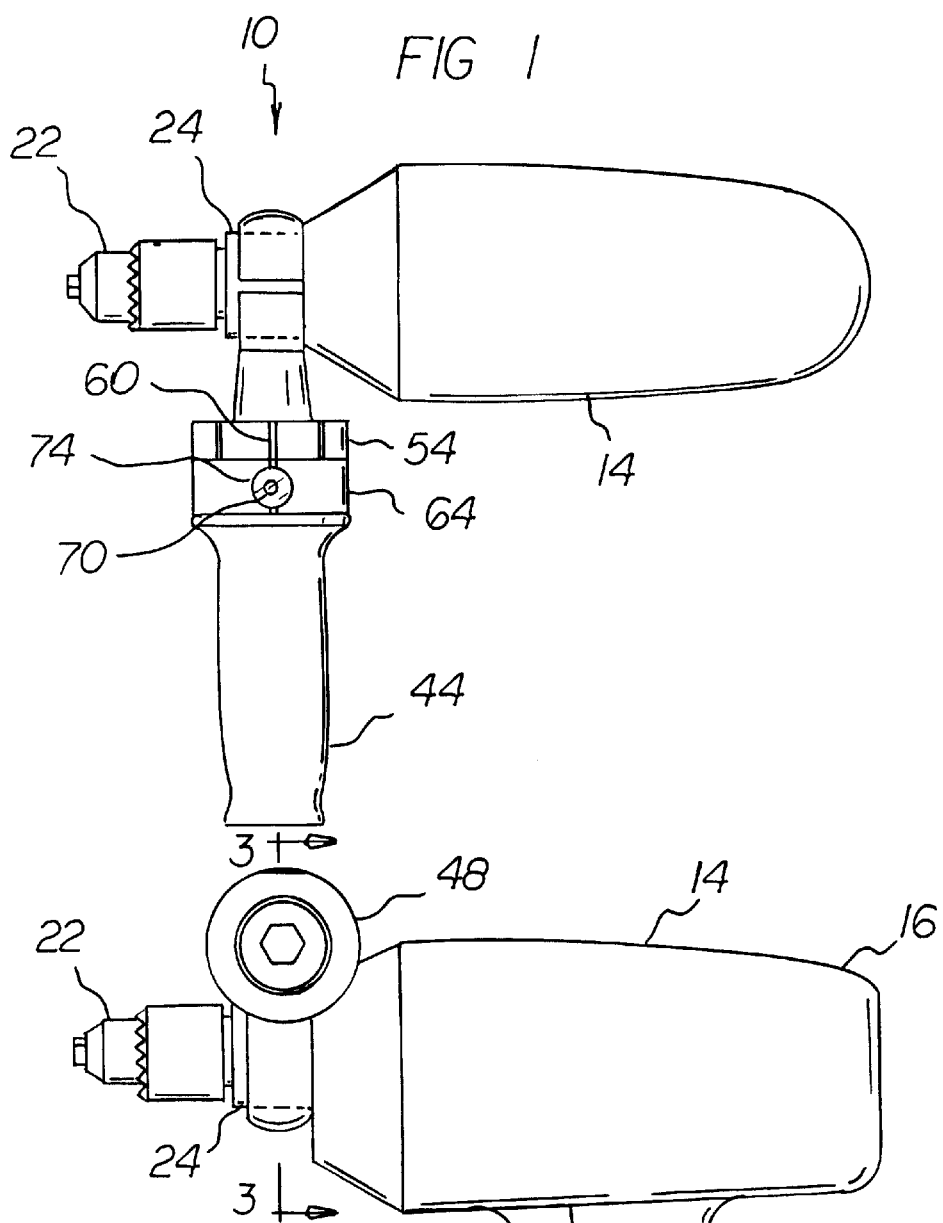
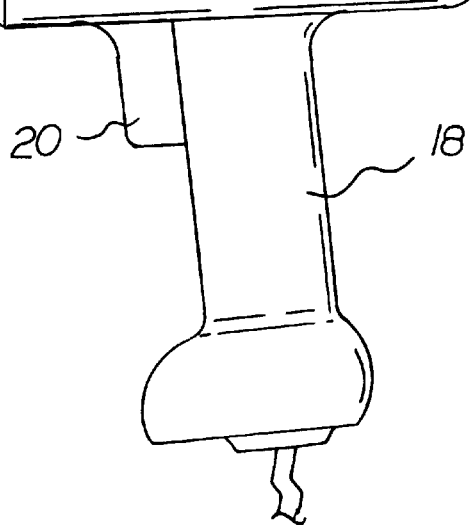

ELECTRIC HAND DRILL SYSTEM

BACKGROUND OF THE INVENTION

1. Field of the Invention

The present invention relates to an electric hand drill system and more particularly pertains to insure the drilling of holes at proper angles.

2. Description of the Prior Art

The use of drills and levels of known designs and configurations is known in the prior art. More specifically, drills and levels of known designs and configurations previously devised and utilized for the purpose of properly drilled holes through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,664,032 to Tompkins issued May 23, 1972 discloses a tool-level indicator structure. U.S. Pat. No. 3,864,839 to Wolf issued Feb. 11, 1975 discloses a directional guide for a power hand drill. U.S. Pat. No. 4,564,322 to Sapley issued Jan. 14, 1986 discloses to a drill scope comprising a calibrated protector. U.S. Pat. No. 4,154,001 to Sarafin discloses an electric hand drill aligning level. U.S. Pat. No. 4,785,544 to Heinsius issued Nov. 22, 1988 discloses a spirit level accessary for handle drill.

While these devices fulfill their respective, particular objectives and requirements, the aforementioned patents do not describe an electric hand drill system that allows for insuring the drilling of holes at proper angles.

In this respect, the electric hand drill system according to the present invention substantially departs from the conventional concepts and designs of the prior art, and in doing so provides an apparatus primarily developed for the purpose of insuring the drilling of holes at proper angles.

Therefore, it can be appreciated that there exists a continuing need for a new and improved electric hand drill system which can be used for insuring the drilling of holes at proper angles. In this regard, the present invention substantially fulfills this need.

SUMMARY OF THE INVENTION

In view of the foregoing disadvantages inherent in the known types of drills and levels of known designs and configurations now present in the prior art, the present invention provides an improved electric hand drill system. As such, the general purpose of the present invention, which will be described subsequently in greater detail, is to provide a new and improved electric hand drill system and method which has all the advantages of the prior art and none of the disadvantages.

To attain this, the present invention essentially comprises an electric hand drill system for insuring the drilling of holes at proper angles. The electric hand drill system comprises a hand held electric drill having a main body portion containing a motor. The motor has a downwardly extending handle and trigger and with a forwardly extending chuck for removably receiving a drill bit rotatable about a primary axis by the motor upon pressing the trigger. The main body portion also has a cylindrical recipient surface between the chuck and the main body portion with an axis coincident with the primary axis. The system also comprises a coupling ring in a generally cylindrical configuration. The ring further has a radial slot formed with an interior bearing surface positionable in contact with the recipient surface and formed with a bore there through and spanning the axial slot. The bore has a six-sided inner recess for receiving the head of a bolt and an outer recess with six equally spaced axial projections. The system also comprises a handle in a cup-shaped configuration. The handle has a six-sided interior bore for receiving a nut and an exterior generally cylindrical surface for being held by a user and a central hole with an axis coincident with the axis of the bore through the coupling ring. The system further includes a first disk. The first disk has a central bore coincident with the bore of the handle and the coupling ring with diametrically opposed pairs of fingers 58 selectively received upon the projections of the coupling ring and with indicia upon exterior surface to indicate the angular orientation of the first disk with respect to the handle and coupling ring and drill. Further included in the system is a second disk. The second disk has an central bore coincident with the bore of the attachment member and the first disk and handle and an exterior surface. Next provides is a spirit level on the second disk in a circular configuration with a hemispherical top and an air bubble therewith to indicate the angular orientation of the system during operation and use. Lastly the system includes a coupling assembly including a bolt extending through the bores of the attachment member and the first disk and the second disk and the handle. The bolt having a first end with a hexagonal head positioned in the inboard end of the coupling ring and a second end with male threads extending into the handle. The coupling assembly also including a hexagonal nut with internal threads received on the threads of the bolt and with an external hexagonal exterior surface received within the handle for tightening the handle and attachment member to the drill at the recipient surface and for insuring the angular orientation of the drill and a bit with respect to a wood piece to be drilled.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electric hand drill system which has all of the advantages of the prior art drills and levels of known designs and configurations and none of the disadvantages.

It is another object of the present invention to provide a new and improved electric hand drill system which may be easily and efficiently manufactured and marketed.

It is further object of the present invention to provide a new and improved electric hand drill system which is of durable and reliable constructions.

An even further object of the present invention is to provide a new and improved electric hand drill system which is susceptible of a low cost of manufacture with regard to both materials and labor, and which accordingly is then susceptible of low prices of sale to the consuming public, thereby making such electrical hand drill system economically available to the buying public.

Even still another object of the present invention is to provide an electric hand drill system for insuring the drilling of holes at proper angles.

Lastly, it is an object of the present invention to provide a new and improved electric hand drill system comprising a hand held electric drill containing a motor. The system also has a coupling ring with a radial slot formed with an interior bearing surface positionable in contact with a recipient surface on the drill. The system further has a handle in a cup-shaped configuration. Finally, the system has a first disk received upon the coupling ring and with indicia upon the exterior surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a drill system constructed in accordance with the principles of the present invention.

FIG. 2 is a side elevational view of the drill system shown in FIG. 1.

The same reference numerals refer to the same parts throughout the various Figures.

DESCRIPTION OF THE PREFERRED EMBODIMENT

Figure 3:
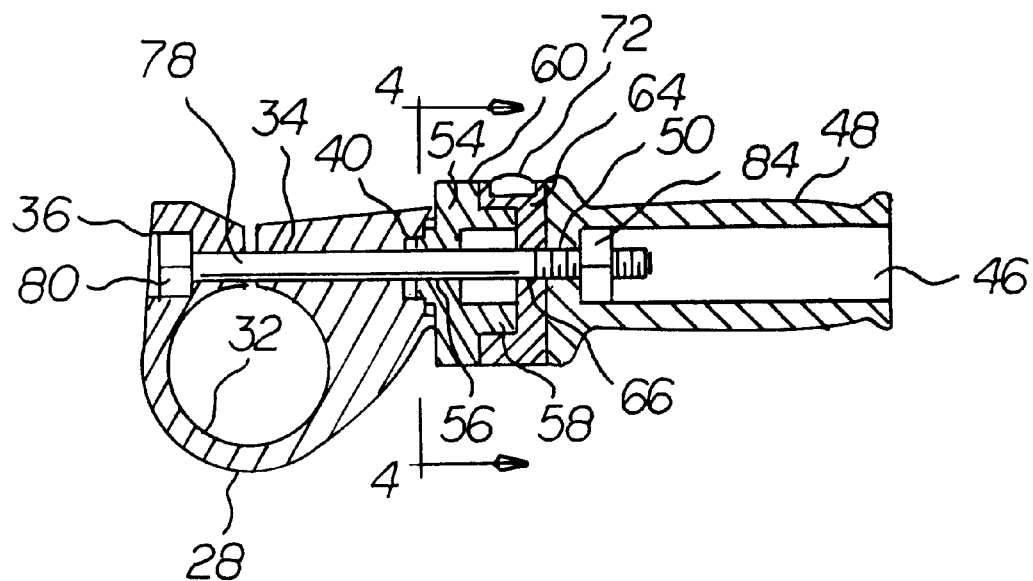
FIG. 3 is a cross sectional view taken along line 3—3 of FIG. 2.
Figure 4:
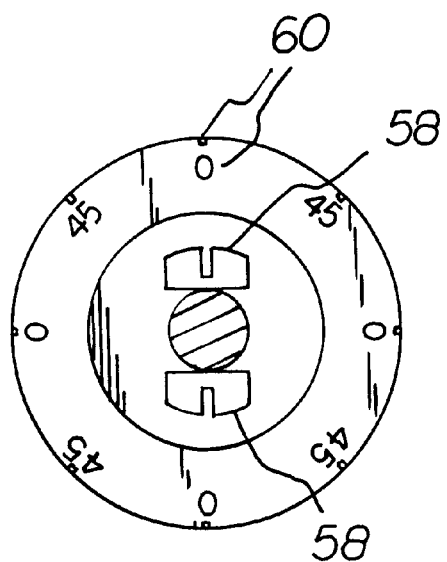
FIG. 4 is a cross sectional view taken along line 4—4 of FIG. 3.
Figure 5:
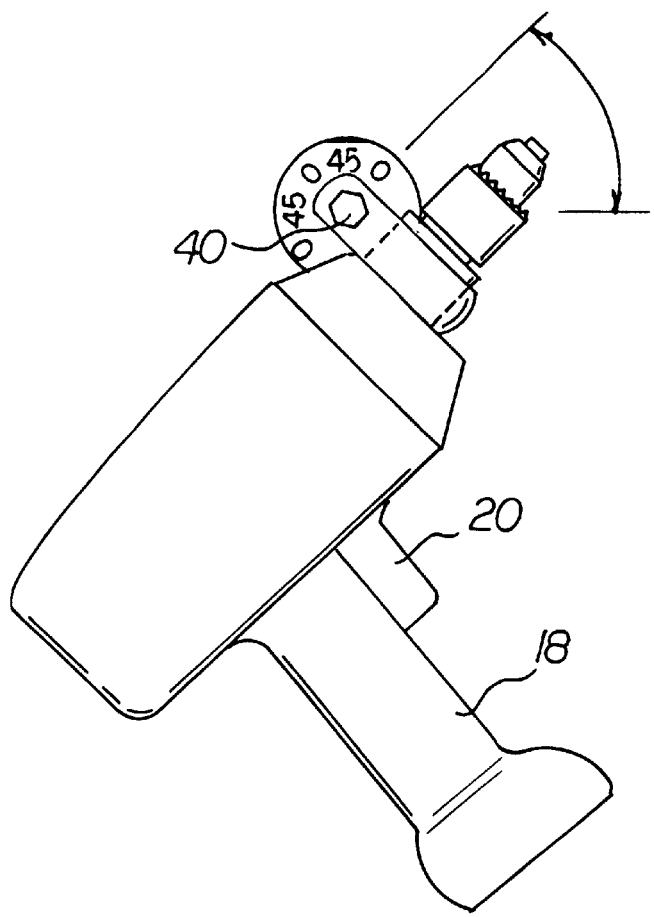
FIG. 5 is a side elevational view opposite for the direction shown in FIG. 2 to illustrate the use of the drill.
Figure 6:
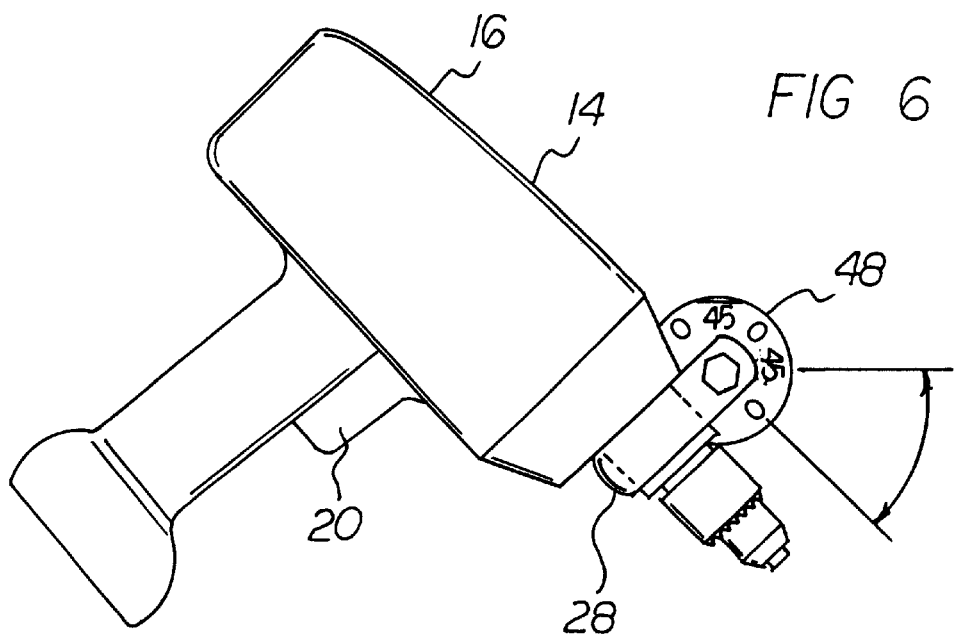
FIG. 6 is a view of drill similar to FIG. 5 but illustrating its use in an opposite orientation.

With reference now to the drawings, and in particular to FIG. 1 thereof, the preferred embodiment of the new and improved electric hand drill system embodying the principles and concepts of the present invention and generally designated by the reference numeral 10 will be described.

The present invention, the electric hand drill system 10 is comprised of a plurality of components. Such components are individually configured and correlated with respect to each other so as to attain the desired objective.

The electric hand drill system comprises a hand held electric drill. The drill has a main body portion 14 containing a motor 16. The motor has a downwardly extending handle 18 and trigger 20 and a forwardly extending chuck 22 for removably receiving a drill bit rotatable about a primary axis by the motor upon pressing the trigger. The main body portion also has a cylindrical recipient surface 24 between the chuck and the main body portion with an axis coincident with the primary axis.

The system also comprises a coupling ring 28 in a generally cylindrical configuration. The ring further has a radial slot 30 formed with an interior bearing surface 32 positionable in contact with the recipient surface and formed with a bore 34 there through and spanning the axial slot. The bore has a six-sided inner recess 36 for receiving the head of a bolt and an outer recess with six equally spaced axial projections 40.

The system also comprises a handle 44 in a cup-shaped configuration. The handle has a six-sided interior bore 46 for receiving a nut and an exterior generally cylindrical surface 48 for being held by a user and a central hole 50 with an axis coincident with the axis of the bore through the coupling ring.

The system further includes a first disk 54. The first disk has a central bore 56 coincident with the bore of the handle and the coupling ring with diametrically opposed pairs of fingers 58 selectively received upon the projections of the coupling ring and with indicia 60 upon exterior surface to indicate the angular orientation of the first disk with respect to the handle and coupling ring and drill. Indicia 60 in the preferred embodiment includes eight equally spaced marking at equal 45 degree spacings although other spacings could be utilized.

In the disclosed preferred embodiment, the projections 40 are planar and extend radially inwardly from the open end of the coupling ring. Such projections are equally spaced with respect to the bore 34 of the coupling 28. In the disclosed preferred embodiment, six such projections are employed and spaced 60 degrees from each other. Their thickness is such as to be received within the opposed sets of fingers 58 of the first disk at diametrically opposed locations in any of six rotational orientations. More or less projections could, of course, by utilized as a function of a particular application.

Further included in the system is a second disk 64. The second disk has an central bore 66 coincident with the bore of the attachment member and the first disk and handle and an exterior surface with indicia for alignment with indicia on the first disk.

Next provides is a spirit level 70 on the second disk in a circular configuration with a hemispherical top 72 and an air bubble 74 therewith to indicate the angular orientation of the system during operation and use.

Lastly the system includes a coupling assembly including a bolt 78 extending through the bores of the attachment member and the first disk and the second disk and the handle. The bolt having a first end with a hexagonal head 80 positioned in the inboard end of the coupling ring and a second end with male threads 82 extending into the handle. The coupling assembly also including a hexagonal nut 84 with internal threads received on the threads of the bolt and with an external hexagonal exterior surface received within the handle for tightening the handle and attachment member to the drill at the recipient surface and for insuring the angular orientation of the drill and a bit with respect to a wood piece to be drilled.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electric hand drill system for insuring the drilling of holes at proper angles comprising, in combination:

a hand held electric drill having a main body portion containing a motor with a downwardly extending handle and trigger and with a forwardly extending chuck for removably receiving a drill bit rotatable about a primary axis by the motor upon pressing the trigger, the main body portion also having a cylindrical recipient surface between the chuck and the main body portion with an axis coincident with the primary axis;

a coupling ring in a generally cylindrical configuration with a radial slot formed with an interior bearing surface positionable in contact with the recipient surface and formed with a bore there through and spanning the axial slot, the bore having a six-sided inner recess for receiving the head of a bolt and an outer recess with six equally spaced axial projections;

a handle in a cup-shaped configuration having a six-sided interior bore for receiving a nut and with an exterior generally cylindrical surface for being held by a user and a central hole with an axis coincident with the axis of the bore through the coupling ring;

a first disk having a central bore coincident with the bore of the handle and the coupling ring with diametrically opposed pairs of fingers selectively received upon the projections of the coupling ring and with indicia upon exterior surface to indicate the angular orientation of the first disk with respect to the handle and coupling ring and drill;

a second disk having an central bore coincident with the bore of the attachment member and the first disk and handle and an exterior surface;

a spirit level on the second disk in a circular configuration with a hemispherical top and an air bubble therewith to indicate the angular orientation of the system during operation and use; and a coupling assembly including a bolt extending through the bores of the attachment member and the first disk and the second disk and the handle for removably coupling the handle and spirit level to the drill, the bolt having a first end with a hexagonal head positioned in the inboard end of the coupling ring and a second end with male threads extending into the handle, the coupling assembly also including a hexagonal nut with internal threads received on the threads of the bolt and with an external hexagonal exterior surface received within the handle for tightening the handle and attachment member to the drill at the recipient surface and for insuring the angular orientation of the drill and a bit with respect to a wood piece to be drilled.

2. An electric hand drill system comprising:

a hand held electric drill containing a motor a coupling ring with a radial slot formed with an interior bearing surface positionable in contact with a recipient surface on the drill;

a handle in a cup-shaped configuration;

a first disk received upon the coupling ring and with indicia upon exterior surface;

a second disk;

a spirit level on the second disk; and a coupling assembly including a bolt extending through the attachment member and the first disk and the second disk and the handle for removably coupling the handle and spirit level to the drill.

3. An electric hand drill system as set forth in claim 2 and further comprising:

the bolt having a first end with a hexagonal head positioned in the inboard end of the coupling ring and a second end with male threads extending into the handle, the coupling assembly also including a hexagonal nut with internal threads received on the threads of the bolt and with an external hexagonal exterior surface received within the handle for tightening the handle and attachment member to the drill at the recipient surface and for insuring the angular orientation of the drill and a bit with respect to a wood piece to be drilled.

* * * * *